US011843753B2

(12) United States Patent
Yamada

(10) Patent No.: US 11,843,753 B2
(45) Date of Patent: *Dec. 12, 2023

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Kazutaka Yamada, Nagakute (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,588

(22) Filed: Dec. 20, 2022

(65) Prior Publication Data

US 2023/0118474 A1    Apr. 20, 2023

Related U.S. Application Data

(63) Continuation of application No. 17/160,507, filed on Jan. 28, 2021, now Pat. No. 11,546,487, which is a
(Continued)

(30) Foreign Application Priority Data

Feb. 1, 2019  (JP) ................... 2019-017065

(51) Int. Cl.
*H04N 1/44* (2006.01)
*G06F 3/12* (2006.01)
*H04N 1/32* (2006.01)

(52) U.S. Cl.
CPC ........... *H04N 1/444* (2013.01); *G06F 3/1206* (2013.01); *G06F 3/1222* (2013.01); *G06F 3/1239* (2013.01); *H04N 1/32144* (2013.01)

(58) Field of Classification Search
CPC .. H04N 1/444; H04N 1/32144; G06F 3/1206; G06F 3/1222; G06F 3/1239
(Continued)

(56) References Cited

U.S. PATENT DOCUMENTS 10,911,638 B2 * 2/2021 Yamada ................ G06F 3/1239
2001/0006585 A1  7/2001 Horigane
(Continued)

FOREIGN PATENT DOCUMENTS

JP  2004-348428 A  12/2004
JP  2005-115874 A   4/2005
(Continued)

OTHER PUBLICATIONS

International Search Report and the Written Opinion dated Mar. 10, 2020 of the International Searching Authority issued in the PCT application No. PCT/JP2020/002920 together with English language translation.
(Continued)

*Primary Examiner* — Quang N Vo
(74) *Attorney, Agent, or Firm* — Scully, Scott, Murphy & Presser, PC

(57) ABSTRACT

A supporting program is executable by a controller of an information processing apparatus and corresponds to a printer connected to the information processing apparatus. The supporting program causes the information processing apparatus to perform processing intermediate image data in accordance with a print parameter received in a print parameter editing process, displaying an image indicated by the processed inter mediate image data on a print preview screen. The information processing apparatus does not restrict printing when print continuation is instructed, while restricting the printing when re-edit or print cancel is instructed.

10 Claims, 6 Drawing Sheets

Related U.S. Application Data continuation of application No. 16/747,923, filed on Jan. 21, 2020, now Pat. No. 10,911,638.

(58) Field of Classification Search
USPC .... 358/1.14, 1.15, 1.9, 3.26, 3.27, 448, 463; 382/254, 275
See application file for complete search history.

(56) References Cited

U.S. PATENT DOCUMENTS

| | | |
|---|---|---|
| 2003/0103221 A1 | 6/2003 | Natori |
| 2006/0061798 A1 | 3/2006 | Takahashi |
| 2007/0076238 A1 | 4/2007 | Odagiri |
| 2009/0154763 A1 | 6/2009 | Yamasaki |
| 2013/0063742 A1 | 3/2013 | Kikuchi |
| 2013/0194601 A1 | 8/2013 | Nakagawa |
| 2015/0015910 A1 | 1/2015 | Mitsui |
| 2017/0223210 A1 | 8/2017 | Yamada |

FOREIGN PATENT DOCUMENTS

| | | |
|---|---|---|
| JP | 2009-147562 A | 7/2009 |
| JP | 2013-058090 A | 3/2013 |
| JP | 2013-161127 A | 8/2013 |
| JP | 2015-18474 A | 1/2015 |
| JP | 2015-041268 A | 3/2015 |
| JP | 2017-134718 A | 8/2017 |
| JP | 2018-6937 A | 1/2018 |
| JP | 2018-50210 A | 3/2018 |

OTHER PUBLICATIONS

Notice of Allowance dated Oct. 1, 2020 from parent U.S. Appl. No. 16/747,923.

Office Action dated Sep. 16, 2021 from parent U.S. Appl. No. 17/160,507.

Office Action dated Mar. 15, 2022 from parent U.S. Appl. No. 17/160,507.

Notice of Allowance dated Aug. 17, 2022 from parent U.S. Appl. No. 17/160,507.

Extended European Search Report dated Oct. 7, 2022 from related EP 20748121.9.

Japanese Reasons for Refusal dated Oct. 10, 2023 from related JP 2022-175372 together with English language translation.

* cited by examiner

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application is a continuation application of U.S. Ser. No. 17/160,507 filed on Jan. 27, 2021, which is a continuation of U.S. Ser. No. 16/747,923 filed on Jan. 21, 2020, now U.S. Pat. No. 10,911,638 granted on Feb. 2, 2021 and claims priority under 35 U.S.C. § 119 from Japanese Patent Application No. 2019-017065 filed on Feb. 1, 2019. The entire subject matter of the applications is incorporated herein by reference.

BACKGROUND

Technical Field

The technical field disclosed in the present specification relates to a non-transitory computer-readable recording medium containing instructions realizing a support program which supports control of a printer, an information processing apparatus and a printing method.

Related Art

As a technique to control a printer from an information processing apparatus such as a personal computer, a configuration of installing a printer driver in the information processing apparatus, generating print data using the printer driver and transmitting the print data has been widely known. The printer driver is provided by a manufacturer of a printer and is adapted to various functions the printer has, and thus can make full use of the printer.

SUMMARY

Recently, a technique of controlling a printer using a printing program which is standardly implemented in an operating system (OS), without using the above-mentioned printer driver, has been in practical use. According to such a technique, the OS associates a printer with the OS-standard printing program. Thereafter, it becomes possible that, when the OS receives a print instruction corresponding to the printer, printing is executed using the OS-standard printing program, without using the printer driver.

Even in the above-mentioned printing using the OS-standard printing program, as with the printing using the printer driver, it is desirable that a processing function for generating print data in which processes such as an magnification/reduction process and a combining process are applied to an image indicated by image data is supported. If the OS-standard printing program supports such processing function, it is possible that processes that are not intended by the user are applied to the print data due to setting mistake by the user or the like. If such print data to which processes are applied is transmitted to a printer, a print product that the user desires will not be output and expendable supplies will be wastefully consumed.

The present specification discloses a technique of reducing printing based on an image to which processes that are not intended by the user are applied in an information processing apparatus in which an OS-standard printing program is implemented.

According to aspects of the present disclosure, there is provided a non-transitory computer-readable recording medium for an information processing apparatus, the information processing apparatus having a controller, a printer being connected to the information processing apparatus, the recording medium containing computer-executable instructions realizing a supporting program corresponding to the printer connected to the information processing apparatus, the supporting program causing, when executed by the controller, the information processing apparatus to perform, when a general-use printing program receives a printing command to cause the printer to execute printing of an image, a receiving process of receiving a process setting used for processing intermediate image data output from the general-use printing program, the intermediate image data being image data indicating an image subjected to be printed in accordance with the printing command, the general-use printing program being a program implemented in an operating system of the information processing apparatus in advance, an intermediate image data processing process of generating a processed intermediate image data which is the intermediate image data to which a process based on the process setting is applied, a determining process of determining whether a condition for restricting printing based on the processed intermediate image data is satisfied, and a restricting process of executing a first process of restricting printing based on the processed intermediate image data when determining that the condition is satisfied, and executing a second process of not restricting the printing based on the processed intermediate image data when determining that the condition is not satisfied.

BRIEF DESCRIPTION OF THE ACCOMPANYING DRAWINGS

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
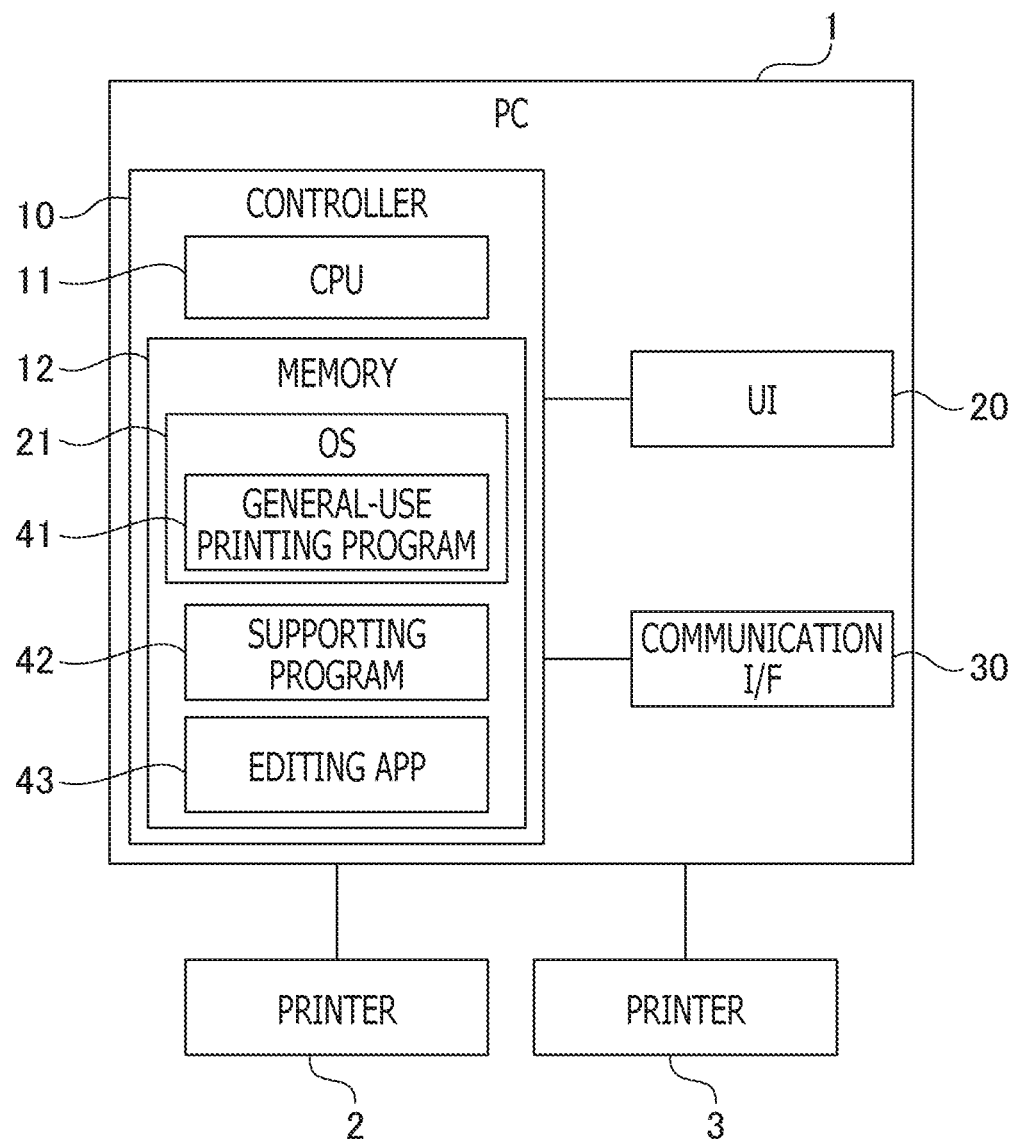
FIG. 1 is a block diagram showing an electrical configuration of a print system.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard or a mouse having an input receiving function.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer drive, which supplied by a printer vendor, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, the editing APP 43 is configured to receive, through the UI 20, a print instruction which causes the printer 2 to execute printing.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Figure 2:
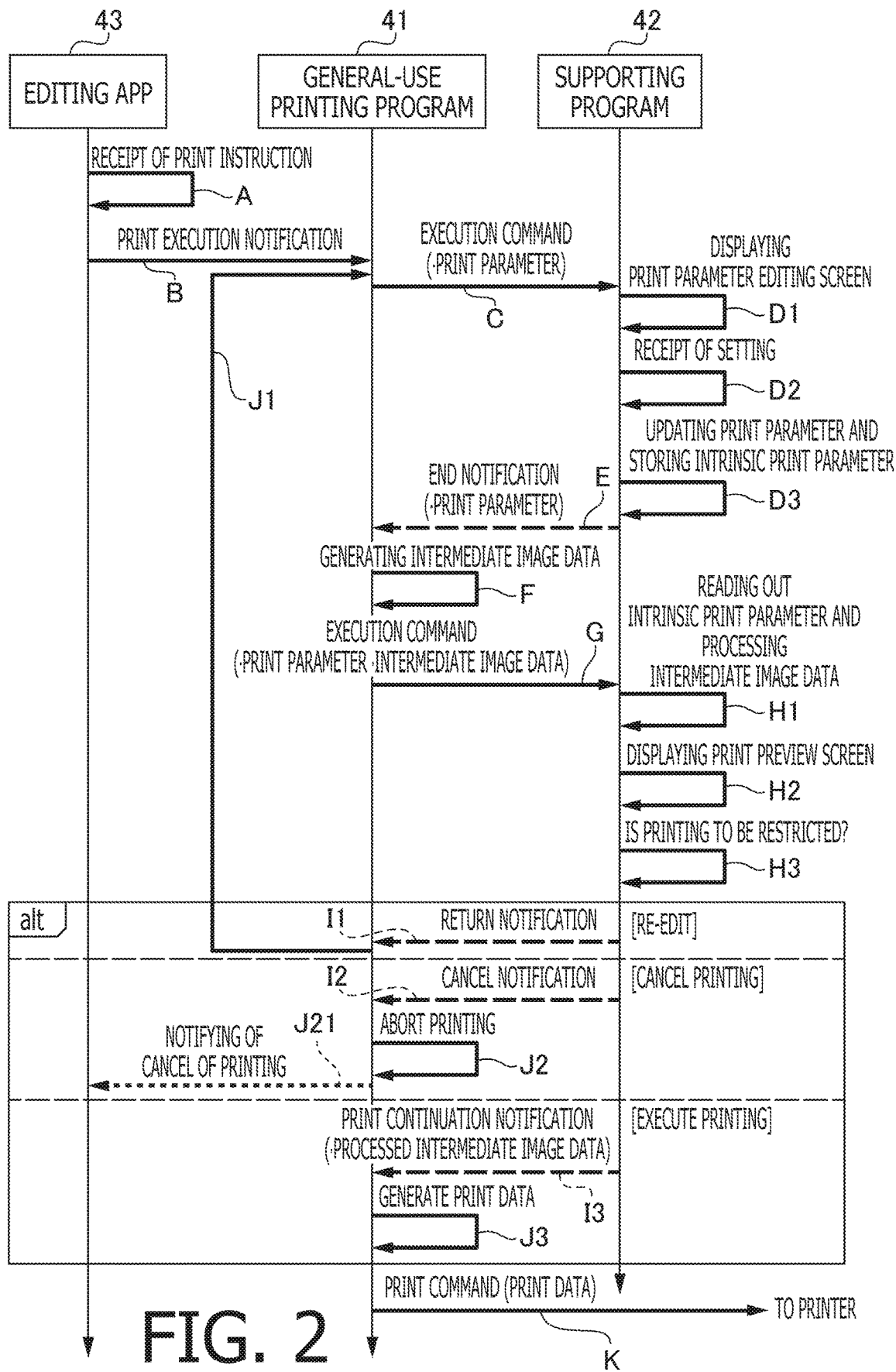
FIG. 2 is a sequential chart showing characteristic parts of a supporting program.

Next, operations of the print system will be described with reference to FIGS. 2-4. As shown in FIG. 2, the print system is characterized in that the supporting program 42 restricts printing if intermediate image data is processed in an intermediate image data processing process in accordance with print parameters edited in a print parameter editing process.

The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the images. Then, the editing APP 43 which received the print instruction delivers a print execution notification indicating contents of received print instruction to the OS 21. It is noted that, in FIG. 2, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, print queue information for identifying a print queue, information indicating print parameters set with the APP, information indicating image data subjected to be printed, and information for identifying a user who instructed to execute printing. It is noted that, as will be described later, these pieces of information are used in the supporting program 42 as well.

The general-use printing program 41 identifies, based on the information included in the print execution notification, a printer designated as a device to be caused to execute printing. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, the general-use printing program 41 outputs an execution command for causing the supporting program 42 to execute processes to activate the supporting program 42. That is, in response to the detection of the print execution notification by the general-use printing program 41, the execution command is output from the general-use printing program 41 to the supporting program 42.

The supporting program 42 is capable of executing a plurality of processes. For example, the supporting program 42 can execute a print parameter editing process for editing print parameters to be used in printing, and an intermediate image data processing process for processing intermediate image data generated by the general-use printing program 41 in accordance with the print parameters. The supporting program 42 executes processes in accordance with types and orders of execution commands output from the general-use printing program 41.

The general-use printing program 41 outputs an execution command for causing the supporting program 42 to execute the print parameter editing process (arrow C). To the execution command of the print parameter editing process, print parameters that the editing APP 43 has received are attached. The supporting program 42 can interpret the print parameters.

Upon receiving the execution command of the print parameter editing process from the general-use printing program 41 (arrow C), the supporting program 42 displays a print parameter editing screen using the UI 20 (arrow D1). The supporting program 42 can obtain the print parameters edited in the editing APP 43 from the execution command of the print parameter editing process. For example, the supporting program 42 reads out print parameters that cannot be edited in the editing APP 43 from a storage area (e.g., the memory 12) and displays them on the print parameter editing screen along with the print parameters obtained from the execution command. That is, the print parameter editing screen can receive change of the print parameters set in the editing APP 43 and setting of the print parameters that cannot be set in the editing APP 43.

As the print parameters, there are general-use parameters that are used in the generation of print data by the general-use printing program 41 and intrinsic parameters that are not used in the generation of print data by the general-use printing program 41. The general-use parameters are, for example, parameters for setting a sheet size, a printing resolution and color/monochromatic printing. The intrinsic parameters are, for example, parameters for setting sheet tray designation, both-side/single-side printing, aggregation printing and addition of watermarks. The print parameter editing screen is a screen for setting, changing and adding the intrinsic parameters. The print parameter editing screen may further be configured such that the general-use parameters can be set, changed and added. It is noted that general editing APPs 43 receives setting, change and addition of the general-use parameters but usually do not receive, or usually do not have a structure for receiving setting, change and addition of the intrinsic parameters.

The general-use parameters are parameters that can be mutually exchanged between the general-use printing program 41 and the supporting program 42. Regarding the general-use parameters, the supporting program 42 edits the very print parameters of a print job. The supporting program 42 may edit the print parameters by overwriting the print parameters of the print job, or may edit the print parameters through the general-use printing program 41 by providing the print parameters to the general-use printing program 41.

On the other hand, the intrinsic parameters are parameters that cannot be mutually exchanged between the general-use printing program 41 and the supporting program 42. The supporting program 42 stores the intrinsic parameters in a storage area for the supporting program 42 in the memory 12 and edits and reads out the intrinsic parameters without using the general-use printing program 41. The storage area for the supporting program 42 may be, for example, a registry prepared by the OS 21. It is noted that, if the general-use printing program 41 can deal with the intrinsic parameters as well, the supporting program 42 may edit the intrinsic parameters through the general-use printing program 41.

Figure 3:
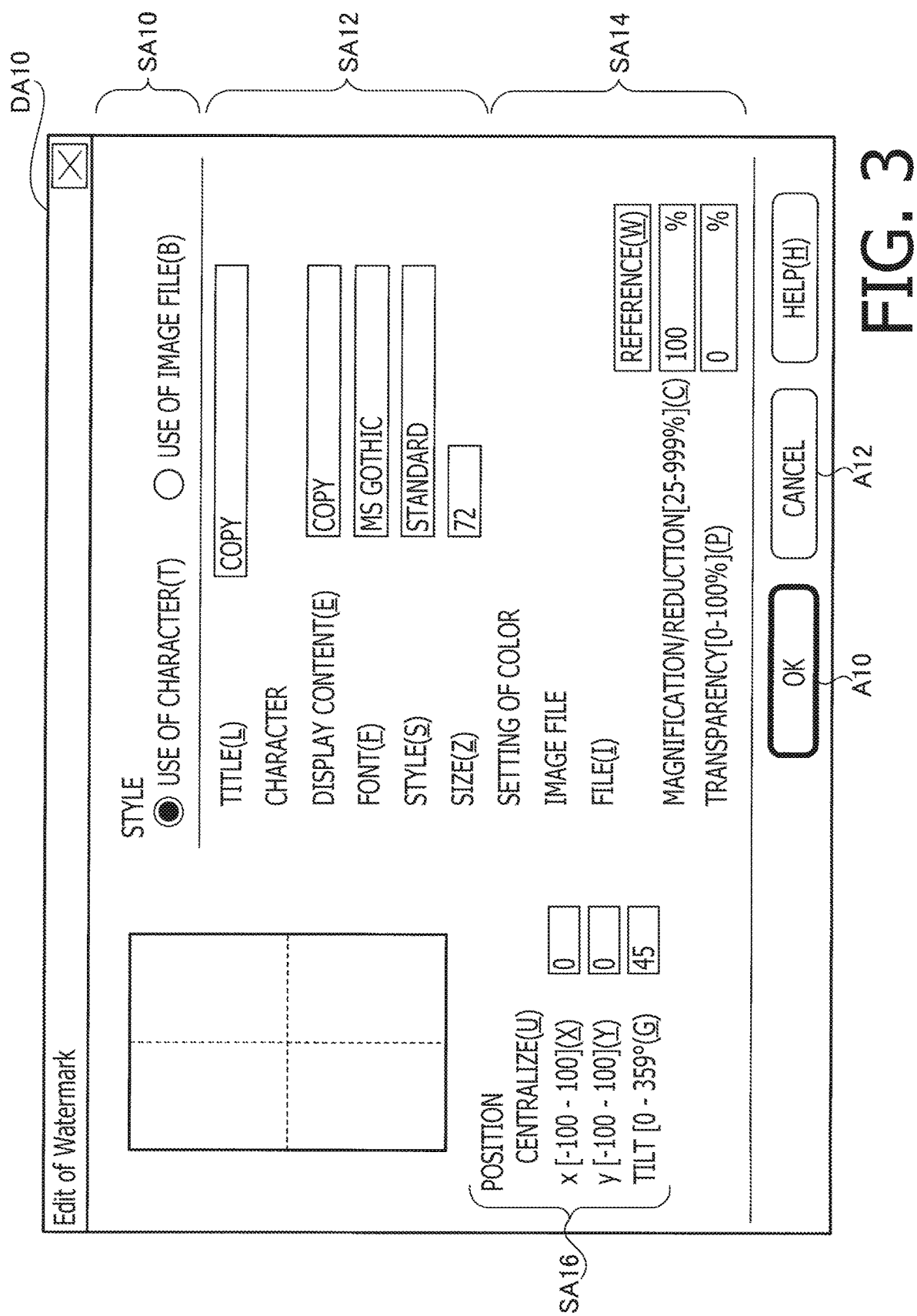
FIG. 3 illustrates an example of a print parameter editing screen.

An example of the print parameter editing screen is shown in FIG. 3. FIG. 3 shows a watermark editing screen DA10 for performing settings on a watermark to be combined with an image indicated by the intermediate image data. The watermark editing screen DA10 includes, for example, a style selecting area SA10, a character setting area SA12, an image file setting area SA14 and a position setting area SA16.

In the style selecting area SA10, it is selected whether to set characters or image files as the watermark. In the character setting area SA12, various settings on characters are performed in case characters are selected in the style selecting area SA10. The various settings on characters include, for example, settings of contents to be displayed, font, style, size and color. In the image file setting area SA14, various settings on image files are performed in case image files are selected in the style selecting area SA10. The various settings on image files include, for example, settings of save location of an image file, image magnification/reduction ratio and transparency. In the position setting area SA16, a printing position of the watermark is set. The watermark editing screen DA10 is provided with an OK button A10 for receiving set contents and a CANCEL button A12 for aborting the setting process.

Referring back to FIG. 2, the supporting program 42 receives set contents in the print parameter editing screen when, for example, the OK button A10 is pressed (arrow D2). Then, the supporting program 42 updates the print parameters received from the general-use printing program 41 in accordance with the received set contents, and stores the updated print parameters in a predetermined storage area as the intrinsic parameters (arrow D3). For example, the supporting program 42 updates the print parameters by attaching set, to the print parameters received from the general-use printing program 41, contents displayed on the watermark editing screen DA10 shown in FIG. 3 at the time the OK button A10 is pressed. The print parameter editing processes indicated by the arrows D1-D3 are examples of a receiving process. Alternatively, the supporting program 42 may edit the print parameters by overwriting the print parameters with the print parameters attached to the execution command of the print parameter editing process, or may edit the print parameters through the general-use printing program 41 by providing the print parameters to the general-use printing program 41.

It is noted that the print parameter editing screen is not limited to the watermark editing screen DA10 but may be screens for performing settings on aggregation setting, dividing, and magnification/reduction of an image indicated by the image data.

Referring back to FIG. 2, when the edition of the print parameters in the print parameter editing process is finished, the supporting program 42 transmits an end notification to the general-use printing program 41 and terminates the process (arrow E). At this time, the supporting program 42 attaches print parameters to the end notification. If the general-use printing program 41 supports the print parameters edited in the print parameter editing process, the attached print parameters are print parameters after the edition. On the other hand, if the print parameters edited in the print parameter editing process are the intrinsic parameters that the general-use printing program 41 does not support, the print parameters before the edition are attached to the end notification. In this case, the intrinsic parameters after the edition are stored in the memory 12 to use them in the later process by the supporting program 42. It is noted that the above-described settings for processing an image in an intermediate image data processing process (arrow H1) which will be described later such as the settings for processing the watermark are examples of process settings.

After outputting the execution command of the print parameter editing process, when the end notification from the supporting program 42 is received, the OS 21 activates the general-use printing program 41 and delivers the end notification to the general-use printing program 41 (arrow E).

After receiving the end notification, the general-use printing program 41 generates the intermediate image data by converting a format of the image data included in the print execution notification to a format of the intermediate image data and generates a print job including the intermediate image data (arrow F). There are various types of image data as the image data included in the editing APP 43, and the general-use printing program 41 converts received image data to an intermediate image data suitable for the generation of the print data. It is noted that, if the image data included in the print execution notification is suitable for the generation of the print data, the generation of the intermediate image data may be omitted and the image data may be directly used as the intermediate image data. The intermediate image data is, for example, XPS format data.

After generating the intermediate image data, the general-use printing program 41 outputs, to the supporting program 42, an execution command for causing the supporting program 42 to execute an intermediate image data processing process for processing the intermediate image data. The intermediate image data generated by the general-use printing program 41 is attached to the execution command.

Upon receiving the execution command of the intermediate image data processing process after the print parameter editing process has been finished (arrow G), the supporting program 42 processes an image indicated by the intermediate image data in accordance with the process settings included in the print parameters received from the general-use printing program 41 or the intrinsic parameters stored in the memory 12 in the print parameter editing process (arrow H1). The process at the arrow H1 is an example of the intermediate image data processing process. For example, aggregation of images, division of an image, magnification/reduction of an image, combining of a watermark image or the like correspond to the image processing. The supporting program 42 can obtain various pieces of information included in the print instruction from the print parameters received from the general-use printing program 41 or the intrinsic parameters stored in the memory 12 in the print parameter editing process and can process the intermediate image data. That is, the supporting program 42 has a function of processing an image being a subject to be printed.

Then, the supporting program 42 displays a print preview screen using the UI 20 (arrow H2). The process at the arrow H2 is an example of a preview process. In the print preview screen, for example, an image indicated by the intermediate image data processed by the supporting program 42 is displayed. The intermediate image data processed by the supporting program 42 is an example of processed intermediate image data.

Figure 4:
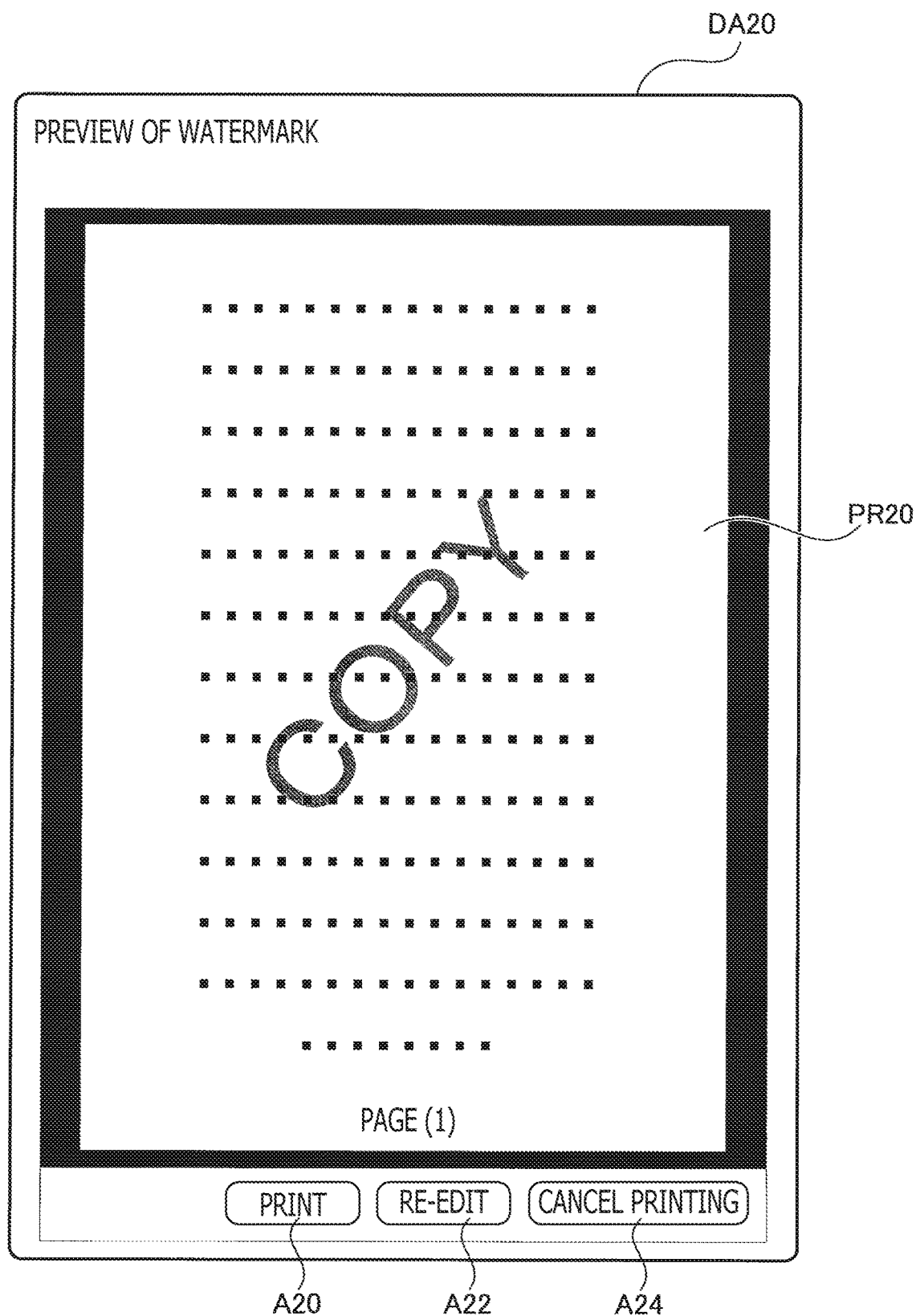
FIG. 4 illustrates an example of a print preview screen.

An example of the print preview screen is shown in FIG. 4. For example, the supporting program 42 combines a watermark with an image indicated by the intermediate image data in accordance with the set contents in the watermark editing screen DA10 shown in FIG. 3 and causes the UI 20 to display a print preview screen DA 20 shown in FIG. 4. In the print preview screen DA 20, a preview image PR 20, a PRINT button A 20, a RE-EDIT button A22 and a CANCEL PRINTING button A24 are displayed.

The preview image PR 20 represents a print image to be printed. As the preview image PR20, for example, an image in which the character string "COPY" being a content to be displayed as a watermark is displayed in the set font, size, color and the like and is further overlaid on the image while tilting it by "45°". Thus, the user can directly confirm, through the PC 1, the print image to which the intrinsic parameters (e.g., the watermark) with which the general-use printing program 41 cannot deal are reflected. Further, the user can determine whether the print image is an intended one or not before printing by the printer 2 starts.

The PRINT button A20 is a button for receiving an operation instructing to execute printing. The RE-EDIT button A22 is a button for receiving an operation instructing to re-edit the watermark. The CANCEL PRINTING button A24 is a button for receiving an operation instructing to cancel printing. Therefore, the print preview screen DA20 can receive the result of the user's determination, through the direct confirmation of the print image, on whether the print image is an intended image or not.

Referring back to FIG. 2, the supporting program 42 determines whether to restrict printing or not in accordance with the operation of the buttons displayed on the print preview screen (arrow H3). The process at the arrow H3 is an example of a determining process. That is, for example, when the RE-EDIT button A22 (see FIG. 4) is pressed and thereby the instruction to re-edit the print parameters is received, the supporting program 42 determines to restrict printing and transmits a return notification to the general-use printing program 41 (arrow I1). The process at the arrow I1 is an example of a restricting process. The return notification is a notification that instructs the general-use printing program 41 to transmit, to the supporting program 42, the execution command of the print parameter editing process.

In response to receiving the return notification, the general-use printing program 41 returns to the process for outputting the execution command of the print parameter editing process (arrow J1). Upon receiving the execution command of the print parameter editing process again from the general-use printing program 41, the supporting program 42 for example displays the watermark editing screen DA10 shown in FIG. 3 again (arrow D1). At this time, the current process settings, that is, the set contents with which printing has been restricted may be reflected in the areas SA10-SA16 of the watermark editing screen DA10 to make it easier for the user to set different contents. Further, in the areas SA10-SA16 of the watermark editing screen DA10, default setting may be reflected. In this case, since the user can redo from the settings of the intrinsic parameters such as the settings of the watermarks without redoing from the input of the print instruction using the editing APP 43, the print system is convenient to use.

Further, for example, when the CANCEL PRINTING button A24 (see FIG. 4) is operated and the supporting program 42 thereby receives the instruction to cancel printing, the supporting program 42 determines to restrict printing and transmits a cancel notification to the general-use printing program 41 (arrow I2). The process at the arrow I2 is an example of the restricting process. The cancel notification is a notification that instructs the general-use printing program 41 to cancel printing.

In response to receiving the cancel notification, the general-use printing program 41 cancel the printing process (arrow J2). Then, the general-use printing program 41 notifies the editing APP 43 that the printing has been cancelled (arrow J21). The editing APP 43 for example displays, using the UI 20, that the printing has been cancelled. Thus, the user can certainly avoid the undesirable processed intermediate image data from being printed. Further, the user can re-input the print instruction to the editing APP 43 and redo the settings of the print parameters.

For example, when the PRINT button A20 (see FIG. 4) is operated and the supporting program 42 thereby receives the instruction to execute printing, the supporting program 42 determines not to restrict printing and transmits a print continuation notification to the general-use printing program 41 (arrow I3). The process at the arrow I3 is an example of the restricting process. The print continuation notification is a notification that instructs the general-use printing program 41 to continue the printing process.

In response to receiving the print continuation notification, the general-use printing program 41 generates print data (arrow J3). Print parameters for generating the print data are the print parameters edited in the print parameter editing process. Intermediate image data used as a generating element of the print data is the intermediate image data processed in the intermediate image data processing process. The print data generated by the general-use printing program 41 is print data of a format that can be used in printing with various types of printers. For example, the print data is PWG Raster data or PDF data. It is noted that, when the supporting program 42 transmits the print data to the printer 2 without using the general-use printing program 41, the supporting program 42 may convert the print data to a data format different from those mentioned above and transmit the converted print data.

After generating the print data, the general-use printing program 41 transmits, to the printer 2, a print command to which the print data is attached (arrow K). Thus, in the printer 2 which received the print command, printing of an image of the print data is executed in accordance with the print data attached to the print command. If print data to which a command is attached is received, the printer 2 performs operations indicated by the command when executing printing.

It is noted that the supporting program 42 may execute a print data editing process. In this case, the supporting program 42 edits the print data as the print data editing process. For example, the supporting program 42 adds, to the print data, commands for causing the printer 2 to execute functions unique to the printer 2. The functions unique to the printer 2 include, for example, a toner save setting and a finisher setting. If the printer 2 has functions of adding watermarks, header/footer and the like to an image by itself, as the print data editing process, the supporting program 42 may add commands for causing the printer 2 to execute these functions to the print data.

In the above-described example, the intermediate image data is attached to the execution command. However, for example, the general-use printing program 41 may store the intermediate image data in the memory 12, and the supporting program 42 which received the execution command may read out the intermediate image data from the memory 12 and execute the intermediate image data processing process. Further, the supporting program 42 may store the general-use parameters and the intrinsic parameters in the memory 12 and transmit only the end notification notifying that the print parameter editing process is finished to the general-use printing program 41, and the general-use printing program 41 may transmit only the execution command of the intermediate image data processing process to the supporting program 42. Further, the supporting program 42 may store the processed intermediate image data in the memory 12 and transmit only the print continuation notification to the general-use printing program 41. In this case, the general-use printing program 41 reads out the processed intermediate image data from the memory 12 to generate the print data.

Next, referring to a flowchart shown in FIG. 5, the intermediate image data processing process of the print system according to the present embodiment will be described. This process is executed by the CPU 11 of the PC 1 in accordance with the OS 21 in response to, after the OS 21 receives the end notification indicating the end of the print parameter editing process, the OS 21 causing the general-use printing program 41 to transmit, to the supporting program 42, an execution command of the intermediate image data processing process, and the supporting program receiving the execution command (arrow G indicated in FIG. 2).

Figure 5:
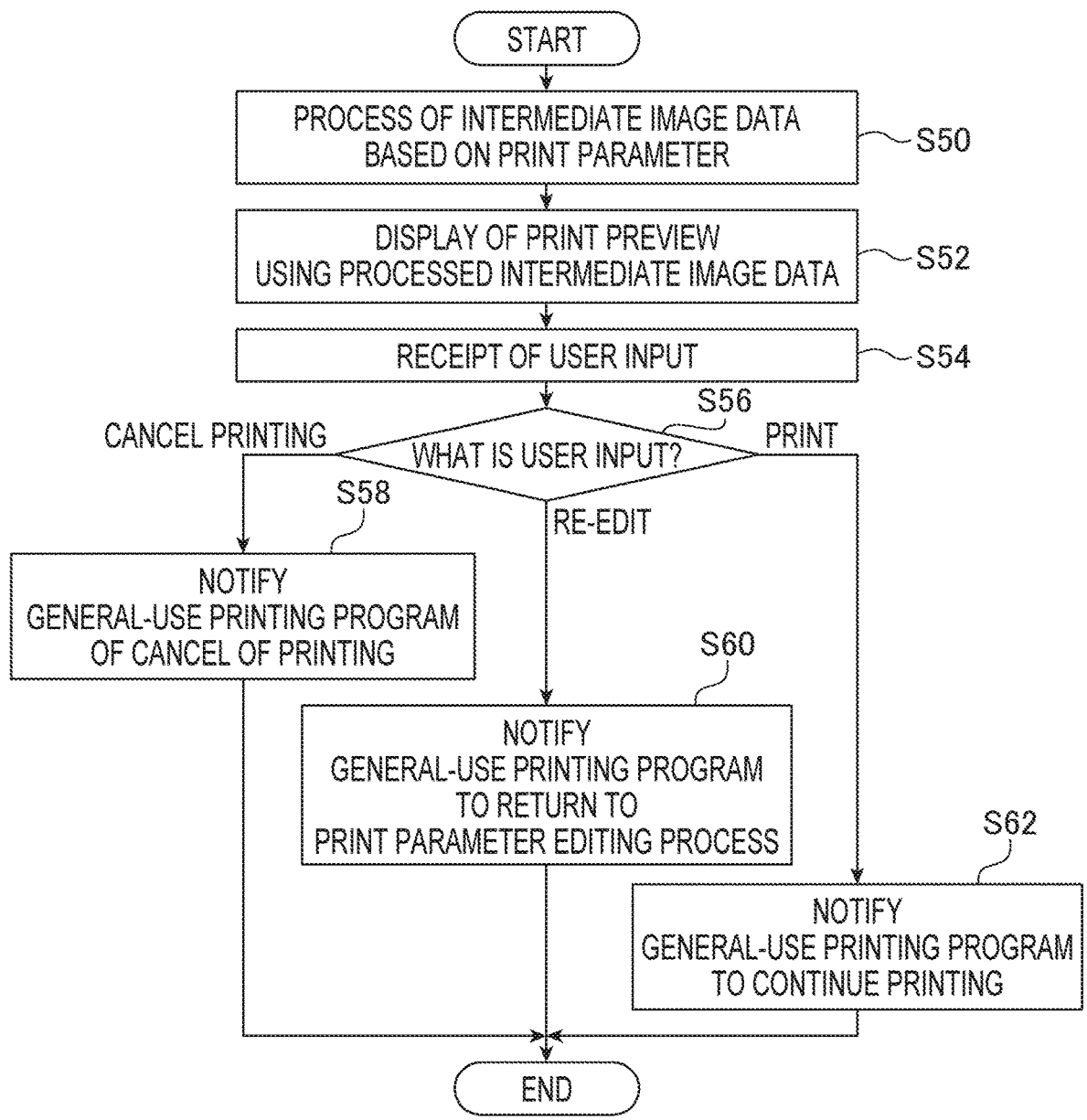
FIG. 5 is a flowchart showing a procedure an intermediate image data processing process.

As shown in FIG. 5, the CPU 11 processes the intermediate image data attached to the execution command in accordance with the print parameters attached to the execution command (S50). The process at S50 is an example of the intermediate image data processing process. Thus, for example, the processed intermediate image data in which a watermark is combined with the intermediate image data is generated.

The CPU 11 causes the UI 20 to display the print preview in which the intermediate image data processed in S50, that is, the processed intermediate image data, is used (S52). The process at S52 is an example of the preview process. Thus, on the PC 1, for example, the print preview screen DA20 shown in FIG. 4 is displayed.

After S52, the CPU 11 receives a user input to the UI 20 (S54). That is, for example, the CPU 11 receives an operation of either of the PRINT button A20, the RE-EDIT button A22 and the CANCEL PRINTING button A24 shown in FIG. 4.

After S54, the CPU 11 determines the content of the user input (S56). The process at S56 is an example of the determining process. When the RE-EDIT button A22 is operated (S56: RE-EDIT), the CPU 11 notifies the general-use printing program 41 to return to the print parameter editing process of the supporting program 42 (S60) and terminates the process. That is, the CPU 11 transmits the return notification to the general-use printing program 41.

On the other hand, when the CANCEL PRINTING button A24 is operated (S56: CANCEL PRINTING), the CPU 11 notifies the general-use printing program 41 that the printing is cancelled (S58) and terminates the process. That is, the CPU 11 transmits the cancel notification to the general-use printing program 41.

Further, When the PRINT button A20 is operated (S56: PRINT), the CPU 11 notifies the general-use printing program 41 to continue the printing process (S62) and terminates the process. That is, the CPU 11 transmits the print continuation notification to the general-use printing program 41. The processes at S58-S62 are examples of the restricting process.

As described above, if there is the print instruction to the general-use printing program 41, the PC 1 which executes the supporting program 42 of the present embodiment receives the edition of the print parameters using the supporting program 42. Then the PC 1 determines whether to restrict the printing based on the processed intermediate image data to which the processes in accordance with the edited print parameters. For example, when the PRINT button A20 is pressed and the PC 1 determines that the printing should not be restricted, the PC 1 can cause the printer 2 to execute printing of an image to which processes intended by the user are applied by not restricting the execution of printing using the supporting program 42. On the other hand, for example, when the RE-EDIT button A22 or the CANCEL PRINTING button A24 is pressed and the PC 1 determines that the printing should be restricted, the PC 1 can cause the printer 2 not to execute printing of an image to which processes not intended by the user are applied by restricting the execution of printing using the supporting program 42. Therefore, according to the present embodiment, in the PC 1 to which the OS-standard general-use printing program 41 is implemented, it is possible to realize a technique for reducing printing based on an image to which processes not intended by the user are applied.

The above-described supporting program 42 causes the UI 20 to display the print preview screen DA20 to let the user confirm the print image, and determines whether to restrict the execution of printing or not in accordance with the user input to the UI 20. However, the supporting program 42 may be configured to automatically determine whether to restrict the execution of printing without causing the UI 20 to display the print preview screen DA20. A procedure of processes in this case will be described with reference to FIG. 6. It is noted that, among processes shown in FIG. 6, processes similar to those shown in FIG. 5 are assigned the same numerals as those used in FIG. 5 in the drawing and descriptions thereof are appropriately omitted.

Figure 6:
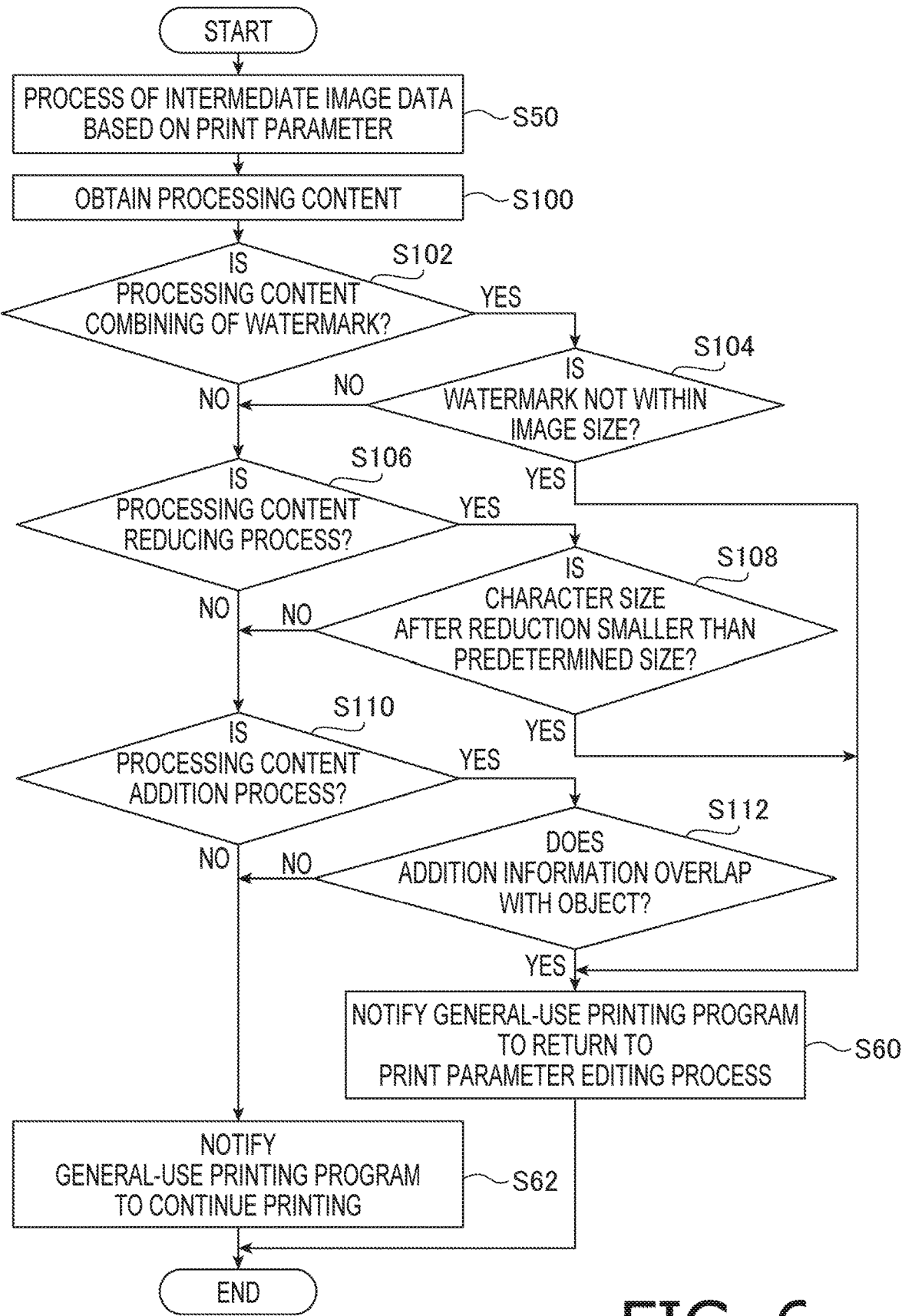
FIG. 6 is a flowchart showing a variation of an intermediate image data processing process.

The processes shown in FIG. 6 are executed in the CPU 11 of the PC 1 in accordance with the OS 21 by the same trigger as the processes shown in FIG. 5 (i.e., at the arrow G shown in FIG. 2). After the processed intermediate image data is generated (S50), the CPU 11 obtains processing contents (S100).

If it is determined that the processing contents include combining of a watermark (S102: YES), the CPU 11 determines whether the watermark is not within an image size of an image indicated by the intermediate image data (S104). The process at S104 is an example of the determining process. If it is determined that the watermark is not within the image size of the image indicated by the intermediate image data (S104: YES), there is a possibility that, even if the processed intermediate image data is printed, characters or images of the watermark are printed in a state where they are broken off halfway. Therefore, the CPU 11 notifies the general-use printing program 41 to return to the print parameter editing process of the supporting program 42 (S60) and terminates the process. The watermark is an example of a designated image.

In the above example, the watermark not being within the image size is set as the condition for restricting the executing of printing. Additionally, if there is a specific area such as an area in the intermediate image data where printing of the watermark is not preferable, the watermark overlapping with the specific area may further be set as the condition for restricting the execution of print.

If it is determined that the watermark is within the image size of the image indicated by the intermediate image data (S104: NO), the CPU 11 determines whether the processing contents include a reducing process for reducing an image included in the intermediate image data (S106). The process at S106 is an example of the determining process. The reducing process is executed, for example, when executing the aggregation printing, when printing an image while dividing it, and when printing an image while adjusting its magnification ratio.

If it is determined that the processing contents include the reducing process (S106: YES), the CPU 11 determines whether a character size of a character object included in the image data after a reduction by the reducing process is smaller than a predetermined size (S108). If the character size after the reduction is smaller than the predetermined size, even if the printing is executed, there will be a problem that the character cannot be read or is hard to read. Accordingly, if it is determined that the character size after the reduction is smaller than the predetermined size (S108: YES), the CPU 11 notifies the general-use printing program 41 to return to the print parameter editing process of the supporting program 42 (S60) and terminates the process.

If it is determined that the character size after the reduction is not smaller than the predetermined size (S108: NO), the CPU 11 determines whether the processing contents include an addition process for adding information indicating a header or a footer to the intermediate image data (S110). The process at S110 is an example of the determining process. If it is determined that the processing contents include the addition process (S110: YES), the CPU 11 determines whether the header or the footer indicated by the addition information overlaps with objects included in an image indicated by the intermediate image data (S112). If the header or the footer is overlapping with the objects, there is possibility that the header or the footer cannot be read even if the intermediate image data is printed. Accordingly, if it is determined that the header or the footer overlaps with the objects (S112: YES), the CPU 11 notifies the general-use printing program 41 to return to the print parameter editing process of the supporting program 42 (S60) and terminates the process.

If it is determined that the header or the footer does not overlap with the objects (S112: NO), the CPU 11 notifies the general-use printing program 41 to continue the printing process (S62). It is noted that the CPU 11 also notifies the general-use printing program 41 to continue the printing process (S62) if it is determined that the processing contents include neither of the combining of a watermark, the reduction of an image and the addition of information to the header or the footer (S102: NO, S106: NO, S110: NO), and terminates the process.

Therefore, the supporting program 42 which causes the PC 1 to execute the intermediate image data processing process shown in FIG. 6 can automatically restrict the printing based on the image not intended by the user without the user's judgement, and thus the supporting program 42 is convenient to use. It is noted that it is not necessary to execute all of S104, S108 and S112 but it is sufficient to execute at least one of them. Further, other conditions may be added to FIG. 6.

It is noted that the embodiment disclosed in the present specification is only an illustrative example and is not intended to limit aspects of the present disclosures. Accordingly, the technique disclosed in the present specification can be modified or enhanced without departing from aspects of the disclosures. For example, the device connected to the PC 1 need not be limited to the single-function printer but may be any device which has a printing function (e.g., an MFP, a copier, a facsimile machine and the like). Further, the number of printers connected to the PC 1 needs not be limited to that in the illustrated example but may be one or three or more.

The print system may be configured such that only one of the processes shown in FIG. 5 and the processes shown in FIG. 6 are executed, or the user can select one of them.

Further, in the embodiment, the supporting program 42 can execute a plurality of processes, but the supporting program 42 need not be able to execute all the processes. For example, the supporting program 42 may only include the configuration for the intermediate image data processing process. Further, the print parameter editing process and the intermediate image data processing process may be separate programs.

The supporting program 42 may not receive the process settings in the print parameter editing process. For example, the process settings may be performed in the editing APP 43, and the supporting program 42 may receive the process settings directly from the editing APP 43.

In the embodiment, as operations of the supporting program 42, only the displaying of the print preview screen and the restriction of the execution of printing are described. However, the supporting program 42 may have other roles.

In the embodiment, the supporting program 42 is executed by outputting the execution command of the supporting program 42 from the general-use printing program 41. However, the execution timing of the supporting program 42 is not limited to the above. For example, the supporting program 42 may be executed in response to a direct execution instruction from the OS 21 or may be a resident program. If the supporting program 42 is a resident program, the supporting program 42 may execute the aforementioned operations upon receiving execution commands.

In any of the flowcharts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, a general-use printing program being a program implemented in an operating system of the information processing apparatus in advance, a printer being connected to the information processing apparatus, the general-use printing program being configured to cause the printer to perform printing without using a printer driver of the printer provided by a vendor of the printer, the recording medium containing computer-executable instructions realizing a supporting program corresponding to the printer connected to the information processing apparatus, the information processing apparatus having a controller, the supporting program causing, when executed by the controller, the information processing apparatus to perform:

a receiving process of receiving a process setting used for processing intermediate image data, the intermediate image data being image data indicating an image to be printed, the intermediate image data being output from the general-use printing program;

an intermediate image data processing process of generating processed intermediate image data, the processed intermediate image data being the intermediate image data processed based on the process setting received in the receiving process;

a determining process of determining whether the processed intermediate image data satisfies a condition of restricting printing; and a restriction process of:
restricting printing based on the processed intermediate image data when the processed intermediate image data satisfies the condition of restricting printing; and
not restricting printing based on the processed intermediate image data when the processed intermediate image data does not satisfies the condition of restricting printing.

2. The non-transitory computer-readable recording medium according to claim 1,
wherein the supporting program, as executed by the controller, causes the information processing apparatus to perform providing the processed intermediate image data to the general-user printing program, and making the general-use printing program continue a process of causing the printer to perform printing based on the processed intermediate image data.

3. The non-transitory computer-readable recording medium according to claim 1,
wherein the supporting program, as executed by the controller, causes the information processing apparatus to perform:
causing a display of the information processing apparatus to display an image indicated by the processed intermediate image data; and
a preview process of receiving selection of whether to allow printing based on the processed intermediate image data, and
wherein, in the determining process, the condition is satisfied when not to allow printing based on the processed intermediate image data is received in the preview process.

4. The non-transitory computer-readable recording medium according to claim 1,
wherein the processing based on the process setting is a combining process of combining a designated image designated by a user with to the image data, and
wherein, in the determining process, the condition is satisfied when the designated image is not within an image size of an image indicated by the processed intermediate image data.

5. The non-transitory computer-readable recording medium according to claim 1,
wherein the processing based on the process setting is a reducing process of reducing an image indicated by the image data, and
wherein, in the determining process, the condition is satisfied when a character size of a character object included in the image data after a reduction by the reducing process is smaller than a particular size.

6. The non-transitory computer-readable recording medium according to claim 1,
wherein the processing based on the process setting is an addition process of adding information indicating a header or a footer to the image data, and
wherein, in the determining process, the condition is satisfied when the header or the footer indicated by the information overlaps with an object included in an image indicated by the image data.

7. The non-transitory computer-readable recording medium according to claim 1,
wherein the supporting program, when executed by the controller, causes the information processing apparatus to perform the receiving process again when the printing based on the processed intermediate image data is restricted in the restriction process.

8. The non-transitory computer-readable recording medium according to claim 1,
wherein the supporting program, when executed by the controller, causes the information processing apparatus to perform canceling the printing when the printing based on the processed intermediate image data is restricted in the restriction process.

9. An information processing apparatus having a controller,
wherein a supporting program corresponding to a printer connected to the information processing apparatus is implemented in the information processing apparatus,
wherein an operating system of the information processing apparatus has a general-use printing program which is implemented in the operating system in advance, the general-use printing program being configured to cause the printer to perform printing without using a printer driver of the printer provided by a vendor of the printer,
wherein, by using the supporting program under control of the operating system, the controller is configured to perform:
a receiving process of receiving a process setting used for processing intermediate image data, the intermediate image data being image data indicating an image to be printed, the intermediate image data being output from the general-use printing program;
an intermediate image data processing process of generating processed intermediate image data, the processed intermediate image data being the intermediate image data processed based on the process setting received in the receiving process;
a determining process of determining whether the processed intermediate image data satisfies a condition of restricting printing; and a restriction process of:
> restricting printing based on the processed intermediate image data when the processed intermediate image data satisfies the condition of restricting printing; and
>
> not restricting printing based on the processed intermediate image data when the processed intermediate image data does not satisfies the condition of restricting printing.

10. A method of controlling an information processing apparatus having a controller, a printer being connected to the information processing apparatus, a supporting program corresponding to the printer being implemented in the information processing apparatus, an operating system of the information processing apparatus having a general-use printing program which is implemented in the operating system in advance, the general-use printing program being configured to cause the printer to perform printing without using a printer driver of the printer provided by a vendor of the printer, wherein the method includes:
> causing the printer to print based on print data generated by the information processing apparatus;
>
> receiving a process setting used for processing intermediate image data, the intermediate image data being image data indicating an image to be printed, the intermediate image data being output from the general-use printing program;
>
> generating processed intermediate image data, the processed intermediate image data being the intermediate image data processed based on the process setting received in the receiving;
>
> determining whether the processed intermediate image data satisfies a condition of restricting printing;
>
> restricting printing based on the processed intermediate image data when the processed intermediate image data satisfies the condition of restricting printing; and
>
> not restricting printing based on the processed intermediate image data when the processed intermediate image data does not satisfies the condition of restricting printing.

* * * * *